(12) United States Patent
Morini et al.

(10) Patent No.: US 7,834,117 B2
(45) Date of Patent: Nov. 16, 2010

(54) PROCESS FOR PREPARING CRYSTALLINE ETHYLENE (CO)POLYMERS

(75) Inventors: Giampiero Morini, Padua (IT); Isabella Camurati, Ferrara (IT); Tiziano Dall'Occo, Ferrara (IT); Dario Liguori, Forino (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 202 days.

(21) Appl. No.: 11/887,527

(22) PCT Filed: Mar. 15, 2006

(86) PCT No.: PCT/EP2006/060740

§ 371 (c)(1),
(2), (4) Date: Sep. 28, 2007

(87) PCT Pub. No.: WO2006/103172

PCT Pub. Date: Oct. 5, 2006

(65) Prior Publication Data

US 2009/0054608 A1 Feb. 26, 2009

Related U.S. Application Data

(60) Provisional application No. 60/667,269, filed on Apr. 1, 2005.

(30) Foreign Application Priority Data

Mar. 30, 2005 (EP) .................................. 05102480

(51) Int. Cl.
  *C08F 110/02* (2006.01)
(52) U.S. Cl. ................. 526/352; 526/124.2; 526/125.5; 502/103; 502/132; 502/133
(58) Field of Classification Search .............. 526/124.2, 526/125.5, 352; 502/103, 132, 133
  See application file for complete search history.

(56) References Cited

U.S. PATENT DOCUMENTS

| 4,220,554 A | | 9/1980 | Scatá et al. |
| 5,118,768 A | | 6/1992 | Job et al. |
| 5,219,961 A | * | 6/1993 | Zucchini et al. .......... 526/124.9 |
| 5,387,749 A | | 2/1995 | Govoni et al. |
| 5,726,261 A | * | 3/1998 | Sacchetti et al. ......... 526/124.2 |
| 5,733,987 A | | 3/1998 | Covezzi et al. |
| 6,228,956 B1 | | 5/2001 | Covezzi et al. |
| 6,544,920 B1 | | 4/2003 | Pennini et al. |
| 2009/0036298 A1 | | 2/2009 | Morini et al. |

FOREIGN PATENT DOCUMENTS

| DE | 3435389 | 4/1986 |
| EP | 301894 | 2/1989 |
| EP | 397122 | 11/1990 |
| EP | 423786 | 4/1991 |
| EP | 444606 | 9/1991 |
| EP | 553805 | 8/1993 |
| WO | 92/21706 | 12/1992 |
| WO | 93/03078 | 2/1993 |
| WO | 2006/103170 | 10/2006 |
| WO | 2006/103171 | 10/2006 |

OTHER PUBLICATIONS

Young-tae Jeong, "Propene polymerization with Mg(OEt)$_2$-supported TiCl$_4$ catalyst, 1," *Makromol. Chem.*, vol. 191, p. 1487-1496 (1990) XP000162127.

T. Garoff et al., "Decrease in activity caused by hydrogen in Ziegler-Natta ethene polymerisation," *European Polymer Journal*, vol. 38, p. 121-132 (2002) XP004308066.

V. K. Gupta et al., "Studies on magnesium dichloride-2,2-dimethoxypropane-titanium tetrachloride catalyst system for propylene polymerization," *Polymer*, vol. 37(8), p. 1399-1403 (1996) XP004069331.

D-H Lee et al., "Propylene Polymerization with Mg(OEt)$_2$/Benzoyl Chloride/TiCl$_4$-Trimethyl Aluminum/External Donor Catalyst Systems," *Journal of Applied Polymer Science*, vol. 47(8), p. 1449-1461 (1993) XP000451876.

* cited by examiner

*Primary Examiner*—Ling-Siu Choi
(74) *Attorney, Agent, or Firm*—Jarrod N. Raphael; Jonathan L. Schuchardt

(57) ABSTRACT

A process for preparing crystalline ethylene (co)polymers comprising (co)polymerizing ethylene in the presence of carried out in the presence catalyst system comprising (a) a solid catalyst component comprising Ti, Mg, halogen, ORI groups, where RI is a C1-C12 hydrocarbon group optionally containing heteroatoms, having ORI/Ti molar ratio of at least 0.5, an amount of titanium, with respect to the total weight of said solid catalyst component, higher than 4% by weight, and showing a specific pattern of the SS-NMR; and (b) an aluminum alkyl compound as a cocatalyst. The process allows to obtain in good yields ethylene polymers with narrow MWD.

11 Claims, No Drawings

PROCESS FOR PREPARING CRYSTALLINE ETHYLENE (CO)POLYMERS

The present invention relates to process for preparing crystalline ethylene (co)polymers comprising polymerizing ethylene, optionally in mixture with olefins CH2=CHR, wherein R is an alkyl, cycloalkyl or aryl radical having 2-12 carbon atoms, in the presence of a catalyst comprising Ti, Mg, halogen, $OR^I$ groups in a specific ratio. The process of the invention is suitable to prepare, in high yields, ethylene (co) polymers having narrow Molecular Weight Distribution (MWD) and showing a good comonomer distribution in and among the polymer chains. The MWD is an important characteristic of ethylene polymers in that it affects both the rheological behaviour, and therefore the processability, and the final mechanical properties. In particular, in the case of LLDPE, polymers with narrow MWD are suitable for films and injection molding in that deformation and shrinkage problems in the manufactured article are minimized. The width of the molecular weight distribution for the ethylene polymers is generally expressed as melt flow ratio F/E, which is the ratio between the melt index measured by a load of 21.6 Kg (melt index F) and that measured with a load of 2.16 Kg (melt index E). The measurements of melt index are carried out according to ASTM D-1238 and at 190° C. A catalyst component for preparing ethylene (co)polymers having narrow MWD is described in the European patent application EP-A-553805. The catalyst, comprising Ti, Mg, halogen, $OR^I$ groups is characterized by a ratio OR/Ti of at least 0.5, by a porosity (determined with mercury porosimeter) of from 0.35 to 0.7 which furthermore has a specific pore distribution. Said catalyst is obtained by a rather long process which comprises the preparation of a $MgCl_2$-alcohol adduct having about 3 moles of alcohol which is first thermally dealcoholated up to an intermediate alcohol content and then chemically dealcoholated up to an almost complete extent. The so created porous precursor is then reacted with a titanium alkoxy compound in the presence of a halogenating agent and, optionally, of a reducing agent. The catalyst so obtained is able to produce ethylene (co)polymers with a narrow MWD but the polymerization activities are low. A polymerization process for the preparation of ethylene homopolymer is also described in U.S. Pat. No. 4,220,554. The catalysts used are obtained by reacting a large excess of $TiCl_4$ with catalyst precursors of general formula $MgCl_n(OR)_{2-n}$ in the presence of an internal electron donor compound at high temperatures (120° C.). The hydrogen response of the final catalyst component however, is not satisfactory and therefore with the disclosed process a too high amount of molecular weight regulator would be needed to produce, in satisfactory yields, ethylene polymers with relatively low molecular weight. This would be a disadvantage when multimodal ethylene polymers should be produced.

In EP 301 894 a catalyst comprising Ti, Mg, halogen, OR groups (R is an aliphatic, aromatic or cycloaliphatic hydrocarbon radical) in which the Mg/Ti molar ratio is from 0.5 to 50 and the OR/Ti is from 1.5 to 5, is used for the preparation of amorphous ethylene copolymers. All the examples are directed to the production of amorphous copolymers and terpolymers with no indication about the suitability for the production of crystalline ethylene polymers with narrow molecular weight distribution.

It is therefore still felt the need of a catalyst component suited to form a catalyst system showing a good balance of polymerization activity, ability to form ethylene polymers with narrow MWD, good hydrogen response and high activity.

The applicant has surprisingly found a process satisfying the above-mentioned needs comprising the use of certain catalyst components characterized by a specific pattern when analyzed through the solid state NMR (SS-NMR). In particular, said process for the preparation of crystalline ethylene (co)polymers comprises polymerizing ethylene alone or in mixture with of olefins $CH_2$=CHR, in which R is hydrogen or a hydrocarbyl radical with 1-12 carbon atoms, in the presence of a catalyst system comprising (a) a solid catalyst component comprising Ti, Mg, halogen, $OR^I$ groups, where $R^I$ is a C1-C12 hydrocarbon group optionally containing heteroatoms, having $OR^I$/Ti molar ratio of at least 0.5, an amount of titanium, with respect to the total weight of said solid catalyst component, higher than 4% by weight, and showing in the pattern of the SS-NMR recorded under the conditions set forth below one or more signals (A) having a maximum in the region 60-75 (ppm) and one or more signals (B) having a maximum in the region 78-108 such that the ratio $I^A/I^B$, in which $I^A$ is the integral of signals having the maximum in the region between 60 and 75 ppm and $I^B$ is the integral of signals having the maximum of the region between 78 and 108 ppm, is higher than 0.8; and (b) an aluminum alkyl compound as a cocatalyst.

Preferably, the ratio $I^A/I^B$ is higher than 1 and more preferably in the range 1-5. Generally, in correspondence with OR/Ti molar ratios in the range 0.5-2 the activity of the catalyst component is higher particularly when the ratio $I^A/I^B$ is higher than 1.2. Generally, for values of OR/Ti molar ratios higher than 2 the hydrogen response is improved particularly when the ratio $I^A/I^B$ is from 1 to 2.

In a preferred aspect the amount of titanium, with respect to the total weight of said solid catalyst component, is higher than 5% and preferably higher than 6% by wt.

The applicant has also found that the catalyst components (a) to be used in the process of the invention, comprising Ti, Mg, halogen, $OR^I$ groups, where $R^I$ is a C1-C12 hydrocarbon group optionally containing heteroatoms, and at least 4% wt of Ti atoms, can also be characterized by the fact that are obtainable by reacting a titanium compound having at least a Ti—Cl bond with a catalyst precursors of formula $MgCl_n(OR^I)_{2-n}$, where n is from 0.5 to 1.5 and $R^I$ has the meaning given above, under conditions such that the said product has a $OR^I$/Ti molar ratio of at least 0.5.

In a preferred embodiment of the invention $R^I$ is a C1-C8 hydrocarbon group selected from alkyl groups. Among them particularly preferred are methyl, ethyl, n-propyl, n-butyl, i-butyl, and tert-butyl.

Moreover, said $OR^I$/Ti molar ratio is preferably higher than 1, very preferably higher than 1.5 and, especially higher than 2.

Among the titanium compounds containing at least one Ti-halogen bond, those having the formula $Ti(OR^I)_{p-y}Cl_y$, wherein $R^I$ has the meaning given above, p is the titanium valence and y is a number comprised between 1 and p, are preferred. Particularly preferred are the titanium compounds in which y ranges from 2 to 4.

Among the catalyst precursors particularly preferred are those in which $R^I$ is selected among a C1-C8 hydrocarbon group, preferably ethyl, and n ranges from 0.6 to 1.4, in particular from 0.7 to 1.3 and especially from 0.8 to 1.2. The said catalyst precursors can be generated by exchange reaction between organometallic compounds of formula $Cl_m$-$MgR_{2-m}$, where m is from 0.5 to 1.5, and R is a hydrocarbon group, with an appropriate $OR^I$ group source. The $OR^I$ sources are for example $R^I$OH alcohols or, preferably, a silicon compound of formula $(R^IO)_rSiR_{4-r}$, where r is from 1 to 4 and $R^I$ has the meaning given above. In turn, as generally known in the art, organometallic compounds of formula $Cl_m$-$MgR_{2-m}$ can be obtained by the reaction between Mg metal and an organic chloride RCl, in which R is as defined above, optionally in the presence of suitable promoters. Preferably, the formation of $Cl_mMgR_{2-m}$ and the further exchange with the $OR^I$ source takes place in one single step. The reaction can be carried out in a liquid inert medium such as hydrocarbon that is liquid at room temperature. Usually, upon a substantial amount of exchange with the OR source occurred, the catalyst precursors precipitate and can be easily isolated.

As mentioned above the reaction between titanium compound having at least a Ti—Cl bond and the catalyst precursor should be carried out under conditions such that the reaction product has a final $OR^I$/Ti molar ratio of at least 0.5 and preferably higher than 1. It is within the ordinary knowledge of the skilled in the art that there are several ways of obtaining the same results. Given that the titanium compound acts as a halogenating agent with respect to the precursor, it is in principle possible to obtain the desired final ratio either by using a limited molar amount of titanium compound or by keeping conditions such that the halogenation activity is depressed.

According to one preferred embodiment, the catalyst component is obtained by reacting the catalyst precursor with a titanium compound, preferably $TiCl_4$, used in an amount such that the molar ratio between the titanium compound and the $OR^I$ groups of the catalyst precursor is 4 or less. Preferably said ratio is lower than 3, and more preferably it ranges from 0.1 to 2.5. In this embodiment the reaction temperature is not particularly critical and can range from room temperature up to 150° C. preferably in the range 40-120° C. In view of the limited amount of titanium compound, preferably $TiCl_4$, it is preferred carrying out the reaction in an inert medium, that is liquid at least at the reaction temperature. Preferred inert medium are liquid aliphatic or aromatic hydrocarbons, optionally chlorinated, and among them those having from 3 to 20 carbon atoms. Especially preferred are propane, n-butane, n-pentane, n-hexane, n-heptane, benzene, toluene and isomers thereof. Mixture of two or more of said hydrocarbons can be used. Provided that the final $OR^I$/Ti molar ratio of at least 0.5 is maintained, the reaction medium can also comprise chlorinated compounds having a chlorinating ability inferior to that of $TiCl_4$ such as $SiCl_4$, $SnCl_4$ and the like.

According to one preferred embodiment the catalyst component is obtained by reacting the catalyst precursor with a titanium compound, preferably $TiCl_4$, used in amounts such the molar ratio between the titanium compound and the $OR^I$ groups of the catalyst precursor is higher than 4. The ratio can be higher than 6 and even higher than 10. In this embodiment the reaction temperature is kept at values lower than 100° C. and preferably in the range 20-80° C. When using sufficient excess of liquid titanium compound, preferably $TiCl_4$, a liquid inert medium can be omitted as the titanium compound acts simultaneously as halogenating agent and reaction medium. However, if desired, a liquid inert medium as those disclosed above can be used also in this embodiment.

The solid catalyst components according to the present invention are converted into catalysts for the polymerization of olefins by reacting them with organoaluminum compounds according to known methods.

In particular, it is an object of the present invention a catalyst for the polymerization of olefins $CH_2$=CHR, in which R is hydrogen or a hydrocarbyl radical with 1-12 carbon atoms, comprising the product of the reaction between:

(a) a solid catalyst component as described above, (b) an alkylaluminum compound and, optionally, (c) an external electron donor compound.

The alkyl-Al compound can be preferably selected from the trialkyl aluminum compounds such as for example trimethylaluminum (TMA), triethylaluminum (TEA), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures between TEA and DEAC are particularly preferred.

The external electron donor compound can be equal to or different from the ED used in the solid catalyst component.

The above mentioned components (a)-(c) can be fed separately into the reactor where, under the polymerization conditions can exploit their activity.

The so formed catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins $CH_2$=CHR, where R is H or a C1-C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed. In a particular embodiment, the gas-phase process can be suitably carried out according to the following steps:

(i) pre-polymerizing with one or more olefins of formula $CH_2$=CHR, where R is H or a C1-C10 hydrocarbon group, up to forming amounts of polymer from about 0.1 up to about 1000 g per gram of solid catalyst component (a); and (ii) polymerizing in the gas-phase ethylene, or mixtures thereof with α-olefins $CH_2$=CHR in which R is a hydrocarbon radical having 1-10 carbon atoms, in one or more fluidized or mechanically stirred bed reactors, in the presence of the product coming from (i).

However, the catalysts of the invention are particularly suited for slurry polymerization in an inert medium such as propane, butane, pentane, hexane, heptane and mixtures thereof.

As already mentioned, the catalysts of the present invention are suitable for preparing crystalline ethylene polymers having the desired balance of catalyst activity, hydrogen response and suitable MWD. In particular it is possible to obtain a very narrow molecular weight distribution which is characterized by a F/E ratio of lower than 35 and in some cases lower than 30. When the ethylene is polymerized together with a minor amount of an alpha olefin as comonomer, selected from propylene, butene-1, hexene-1 and octene-1, a linear low density polyethylene having a density lower than 0.940 g/cm³ with a very good quality is obtained which is indicated by the low ratio among weight of xilene soluble fraction and weight of comonomer in the chain. In addition, the catalyst of the invention also show a very good hydrogen response, i.e., the capability of producing low molecular weight polymers in dependence of a given content of molecular weight regulator (usually hydrogen) in the polymerization system. This feature is particularly useful when polymers with a bimodal molecular weight distribution are to be prepared in sequential polymerization steps. In this case, it is suitable to have a catalyst with a good hydrogen response because low molecular weight polymers are produced with a minor amount of Mw regulator and, as a consequence, with a higher activity.

Non limitative examples of other polymers that can be prepared with the catalyst of the invention are very-low-density and ultra-low-density polyethylenes (VLDPE and ULDPE, having a density lower than 0.920 g/cm³, to 0.880 g/cm³) consisting of copolymers of ethylene with one or more alpha-olefins having from 3 to 12 carbon atoms, having a mole content of units derived from ethylene of higher than 80%; high density ethylene polymers (HDPE, having a density higher than 0.940 g/cm³), comprising ethylene homopolymers and copolymers of ethylene with alpha-olefins having 3-12 carbon atoms; The following examples are given in order to further describe the present invention in a non-limiting manner.

Characterization

The properties are determined according to the following methods:

Melt Index: measured at 190° C. according to ASTM D-1238 condition "E" (load of 2.16 Kg), "P" (load of 5.0 Kg) and "F" (load of 21.6 Kg);

Fraction soluble in xylene. The solubility in xylene at 25° C. was determined according to the following method: About 2.5 g of polymer and 250 cm³ of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene or α-olefins were determined via Infrared Spectrometry.

Effective density: ASTM-D 1505

Thermal analysis: Calorimetric measurements were performed by using a differential scanning calorimeter DSC Perkin-Elmer. The instrument is calibrated with indium and tin standards. The weighted sample (5-10 mg), obtained from the Melt Index determination, was sealed into aluminum pans, thermostatted at 5° C. for 3 minutes, heated to 200° C. at 20° C./min and kept at that temperature for a time long enough (5 minutes) to allow a complete melting of all the crystallites. Successively, after cooling at 20° C./min to −20° C., the peak temperature was assumed as crystallization temperature (Tc). After standing 5 minutes at 0° C., the sample was heated to 200° C. at a rate of 20° C./min. In this second heating run, the peak temperature was assumed as melting temperature (Tm) and the area as the global melting hentalpy (ΔH).

Determination of Mg Ti: has been carried out via inductively coupled plasma emission spectroscopy (ICP).

Determination of Cl: has been carried out via potentiometric tritration.

Determination of alkoxides (as ROH): via Gas-Chromatography analysis after hydrolysis of the catalyst.

Solid State NMR analysis. Solid state $^{13}$C-NMR spectra were recorded on a Bruker DPX-200 spectrometer operating at 50.32 MHz in the Fourier transform mode. Samples were measured at room temperature in a 7 mm $ZrO_2$ rotor using a spinning speed of 4 KHz. Transients were accumulated using the cross polarization magic angle spinning technique (CP-MAS) with a recycle delay of 5 sec. and a contact time of 1 msec. All NMR experiments employed a proton decoupling field of sufficient magnitude to ensure full decoupling over the entire spectral width.

The rotors were prepared under nitrogen atmosphere.

Crystalline polyethylene in orthorhombic phase was taken as an external reference at 32.85 ppm from tetramethylsilane (TMS)

$I_A$ is defined as the integral of the signals having the maximum in region between 60 and 75 ppm.

$I_B$ is defined as the integral of the signals having the maximum in the region between 78 and 108 ppm.

EXAMPLES

All the solvent were deoxygenated, dried over $LiAlH_4$ and distilled under nitrogen atmosphere before the use.

TEA is Tris-Ethyl-Aluminum

TiBA is Tris-isoButyl-Aluminum

General Preparation of the Precursor

The synthesis of the precursor was performed as described in Example 1 of U.S. Pat. No. 4,220,554. The so obtained support has the following composition:

Mg, 20.2 wt. %

Cl, 29.8 wt. %

EtO groups 41.5 wt. %

Example 1

Into a 500 cm3 four-necked round flask, purged with nitrogen, 280 cm³ of heptane and 17.7 g (147 mg.at. of Mg) of the support previously prepared, were introduced at 25° C. Then, at the same temperature, 17 cm³ (0.154 mol.) of $TiCl_4$ were added under stirring. The temperature was raised to 50° C. in 1 h and maintained for 2 hours. Then, the stirring was discontinued, the solid product was allowed to settle for 30 minutes and the supernatant liquid was siphoned off.

The solid was washed twice with anhydrous heptane (2×100 cm³) at 50° C. and three times at 25° C. Finally, the solid was dried under vacuum and analyzed. The results are reported in table 1.

Example 2-9

The procedure reported in Example 1 was repeated changing the solvent, $TiCl_4$ amount and temperature/time of treatment as reported in table 1.

Example 10

15.5 g of the support (129 mg.at. of Mg) were charged, under stirring at 0° C., to a 500 cm³ reactor containing 220 cm³ of pure $SiCl_4$ and 6.9 cm³ of pure $TiCl_4$ (62.5 mmol). The temperature was slowly raised to 40° C., then the temperature was kept constant for 4 hours. The stirring was discontinued, settling was allowed to occur and the liquid phase was removed at the temperature of 40° C. The residue was washed with anhydrous heptane, 150 cm³ at 40° C. (twice) then 3 times (150 cm³ each time) with anhydrous heptane at room temperature. The residual solid component was vacuum dried at 50° C. and analyzed. The catalyst characteristics are reported in table 1.

Example 11

In a 500 cm³ four-necked round flask equipped with a mechanical stirrer and purged with nitrogen, 220 cm³ of $TiCl_4$ were charged. The temperature was set at 0° C. and 15.3 g (127 mg.at. of Mg) of the solid support were slowly fed. The temperature was raised to 40° C. and the mixture was stirred for 4 hours. Then, the stirring was discontinued, the solid product was allowed to settle and the supernatant liquid was siphoned off.

The solid was washed twice with anhydrous heptane (2×100 cm³) at 40° C. and twice at 25° C., recovered, dried under vacuum and analyzed. The characteristics are collected in table 1.

Comparative Example 1

A catalyst component was prepared according to the description of Example 2(a) of U.S. Pat. No. 4,220,554. The catalyst was used in the polymerization of ethylene according to the general polymerization procedure under the specific conditions reported in table 1.

Examples 12-14

The procedure reported in Example 11 was repeated changing the temperature and time of treatment as reported in table 1.

Examples 15-26 and comparison Example 2

Ethylene Polymerization: General Procedure

A 4.5 liter stainless-steel autoclave equipped with a stirrer, temperature and pressure indicator, feeding line for hexane, ethylene, and hydrogen, was used and purified by fluxing pure nitrogen at 70° C. for 60 minutes. Then, 1550 cm³ of hexane containing 4.9 cm³ of 10% by wt/vol TEA/hexane solution, was introduced at a temperature of 30° C. under nitrogen flow. In a separate 200 cm³ round bottom glass bottle were successively introduced, 50 cm³ of anhydrous hexane, 1 cm³ of 10% by wt/vol, TEA/hexane solution and about 0.010÷0.025 g of the solid catalyst of table 1. They were mixed together, aged 10 minutes at room temperature and introduced under nitrogen flow into the reactor. The autoclave was closed, then the temperature was raised to 85° C., hydrogen (partial pressure as indicated in table 2) and ethylene (7.0 bars partial pressure) were added.

Under continuous stirring, the total pressure was maintained at 85° C. for 120 minutes by feeding ethylene. At the end the reactor was depressurised and the temperature was dropped to 30° C. The recovered polymer was dried at 70° C. under a nitrogen flow.

The amount of recovered polyethylene and the polymer characteristics are reported in table 2.

Example 27-31

Ethylene/α-Olefin Copolymerization: General Procedure

A 4.5 liter stainless-steel autoclave equipped with a stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (the amount reported in table 3), ethylene (7.0 bar, partial pressure) and hydrogen (as in table 3).

In a 100 cm³ three neck glass flask were introduced in the following order, 50 cm³ of anhydrous hexane, the Al-alkyl/hexane solution (as reported in Table 3), optionally the external electron donor compound (table 3) and the solid catalyst 0.005-0.015 g (reported in table 3). They were mixed together and stirred at room temperature for 5 minutes and then introduced in the reactor through the steel vial by using a nitrogen overpressure.

Under continuous stirring, the total pressure was maintained constant at 75° C. for 60 minutes by feeding ethylene. At the end the reactor was depressurized and the temperature was dropped to 30° C. The recovered polymer was dried at 70° C. under a nitrogen flow and weighted. The polymer was the characterized as reported in table 3.

Example 32

Following the procedure of example 1 and under the conditions of example 3, a solid catalyst component was achieved:

Mg, 15.5 wt. %; Ti, 7.8 wt. %; EtOH, 22.9 wt. % (EtO/Ti=3.1 molar ratio) $I_A/I_B$ (SS-NMR)=1.34.

The solid catalyst was used in the ethylene/1-butene copolymerization in a fluidized gas-phase reactor as described in the following.

A 15.0 liter stainless-steel fluidized reactor equipped with gas-circulation system, cyclone separator, thermal exchanger, temperature and pressure indicator, feeding line for ethylene, propane, 1-butene, hydrogen, and a 1 L steel reactor for the catalyst pre-activation (prepolymerization if needed) and injection. The gas-phase apparatus was purified by fluxing pure nitrogen at 40° C. for 12 hours and then was circulated a propane (10 bar, partial pressure) mixture containing 1.5 g of the same Aluminum alkyl used in polymerization, at 80° C. for 30 minutes. It was then depressurized and the reactor washed with pure propane, heated to 75° C. and finally loaded with propane (14.3 bar partial pressure), 1-butene (1.4 bar partial pressure), ethylene (3.8 bar, partial pressure) and hydrogen (0.5 bar, partial pressure).

In a 100 cm3 three neck glass flask were introduced in the following order, 20 cm3 of anhydrous hexane, 8.4 mmol of TiBA as hexane solution and 0.072 g of the solid component upper described. They were mixed together and stirred at room temperature for minutes and then introduced in the preactivation reactor maintained in a propane flow. The autoclave was closed and 100 g of propane were introduced at 40° C. The mixture was allowed stirring at 50° C. for 30 minutes. The activated catalyst was then injected into the gas-phase reactor by using a propane overpressure (1 bar increase in the gas-phase reactor). The final pressure, in the fluidized reactor, was maintained constant at 80° C. for 120 minutes by feeding a 7 wt. % 1-butene/ethylene mixture.

At the end, the reactor was depressurised and the temperature was dropped to 30° C. The recovered polymer was dried at 70° C. under a nitrogen flow and weighted. 1170 g were achieved providing a mileage of 16.2 kg/gcat with the following characteristics:

MI E, 0.7 dg/min

MFR (MI F/MI E), 32.3

1-butene content, 7.2 wt. %

Xylene Soluble content, 3.7 wt. %

Tm, 120.5° C.

TABLE 1

| | Catalyst preparation | | | | Catalyst composition | | | | |
| --- | --- | --- | --- | --- | --- | --- | --- | --- | --- |
| Ex. | solvent | Ti/Mg m·r | Temp. ° C. | time h | Mg wt. % | Ti wt. % | EtOH wt. % | EtO/Ti m·r | SS-NMR $I_A/I_B$ |
| 1 | heptane | 1.0 | 50 | 2 | 14.7 | 8.2 | 22.3 | 2.8 | — |
| 2 | heptane | 0.45 | 70 | 2 | 15.0 | 7.4 | 33.1 | 4.7 | 1.32 |
| 3 | heptane | 0.7 | 70 | 2 | 15.0 | 8.0 | 21.6 | 2.8 | 1.25 |
| 4 | heptane | 2 | 70 | 2 | 15.1 | 8.4 | 15.9 | 2 | 1.21 |
| 5 | heptane | 1 | 90 | 2 | 14.8 | 8.7 | 17.5 | 2.1 | 1.28 |
| 6 | decane | 0.7 | 120 | 2 | 13.8 | 11.1 | 10.9 | 1.0 | 1.11 |
| 7 | toluene | 0.7 | 40 | 4 | 16.0 | 7.2 | 22.2 | 3.2 | 1.62 |
| 8 | toluene | 1.0 | 70 | 4 | 16.9 | 6.8 | 18.2 | 2.8 | 1.53 |
| 9 | toluene | 7.8 | 40 | 4 | 15.9 | 8.8 | 18.9 | 2.2 | 1.19 |
| 10 | $SiCl_4$ | 0.5 | 40 | 4 | 16.8 | 4.6 | 25.9 | 5.9 | 2.60 |
| 11 | $TiCl_4$ | 15.7 | 40 | 4 | 16.2 | 7.6 | 17.8 | 2.4 | 1.60 |
| 12 | $TiCl_4$ | 17.7 | 120 | 1/0.5/0.5 | 19.1 | 5.5 | 5.2 | 1.0 | — |
| 13 | $TiCl_4$ | 20.7 | 135 | 2 | 18.1 | 7.2 | 4.0 | 0.6 | >55 |
| 14 | $TiCl_4$ | 31.3 | 90 | 4 | 17.2 | 7.4 | 12.4 | 1.7 | 1.35 |
| Comp. | $TiCl_4$/EB | 10.2 | 120/120 | 2/2 | 21.6 | 3.2 | 3.0 | 1.0 | — |

— not determined

TABLE 2

| | | Polymerization conditions | | Polymer Characterization | | | |
| --- | --- | --- | --- | --- | --- | --- | --- |
| Ex. | Solid cat. component | $H_2$ bar | Polymer g | Yield Kg/g$_{cat}$ | MI E g/10' | MIF/ MIP | MIF/ MIE |
| 15 | 1 | 4.00 | 630 | 36.8 | 17.8 | — | — |
| 16 | 2 | 3.0 | 480 | 25.7 | 3.60 | 9.9 | 28.9 |
| 17 | 4 | 3.00 | 605 | 27.5 | 14.6 | — | 28.8 |
| 18 | 5 | 4.00 | 580 | 48.3 | 16.5 | 11.4 | 35.2 |
| 19 | 6 | 3.00 | 400 | 20.7 | 2.5 | 10.3 | 30.9 |
| 20 | 8 | 3.00 | 540 | 27.4 | 11.60 | 10.2 | 30.0 |
| 21 | 9 | 3.00 | 510 | 26.0 | 11.10 | 10.2 | 31.8 |
| 22 | 10 | 3.00 | 610 | 29.8 | 4.40 | 9.8 | 27.3 |
| 23 | 11 | 3.00 | 537 | 51.6 | 19.20 | 9.9 | 29.2 |
| 24 | 12 | 4.00 | 550 | 26.4 | 10.40 | 10.9 | 32.5 |
| 25 | 13 | 3.00 | 484 | 32.0 | 1.8 | 10.6 | 32.5 |
| 26 | 14 | 3.00 | 410 | 38.6 | 18.80 | 9.9 | 29.3 |
| Comp. | | 4.00 | 168 | 8.5 | 1.6 | 9.8 | 30.7 |

TABLE 3

| | | | Polymerization conditions | | | | Polymer Characterization | | | | |
| --- | --- | --- | --- | --- | --- | --- | --- | --- | --- | --- | --- |
| Ex. | Solid cat. component | Cocatalyst type | α-olefin $C_4^-$ g | $H_2$ Bar | time min | polymer g | Yield Kg/g*h | MIE g/10' | $C_4$ wt. % | X.S wt. % | Tm ° C. |
| 27 | 3 | TEA(1) | 180 | 1.00 | 61 | 180 | 33.4 | 4.3 | 8.1 | 6.7 | 123.5 |
| 28 | 5 | TEA/DEAC/THF(2) | 150.0 | 1.00 | 21 | 202 | 38.5 | 2.8 | 7.8 | 5.6 | 121.6 |
| 29 | 7 | TEA/DEAC/THF(2) | 180.0 | 1.50 | 88 | 190 | 14.7 | 2.4 | 6.8 | 4.7 | — |

TABLE 3-continued

| | | Polymerization conditions | | | | Polymer Characterization | | | | |
|---|---|---|---|---|---|---|---|---|---|---|
| Ex. | Solid cat. component | Cocatalyst type | α-olefin C4⁻ g | H₂ Bar | time min | polymer g | Yield Kg/g * h | MIE g/10' | C₄ wt. % | X.S wt. % | Tm °C. |
| 30 | 10 | TEA(1) | 180.0 | 0.50 | 120 | 168 | 16.8 | 0.5 | 4.8 | 3.0 | 124.8 |
| 31 | 11 | TEA/DEAC/THF(2) | 180.0 | 1.5 | 57 | 176 | 21 | 3.4 | 7.8 | 6.0 | 122.5 |

Polym. Cond (1).: Propane 800 g; TEA, 6.1 mmol; C₂H₄ 7 bar; Temper. 75° C.;.
Polym. Cond. (2): Propane 800 g; TEA, 5.7 mmol; DEAC, 2.7 mmol; THF, 1.7 mmol; C₂H₄ 7 bar; Temper. 75° C.;.

The invention claimed is:

1. A process for preparing crystalline ethylene (co)polymers comprising polymerizing ethylene alone or with olefins $CH_2$=CHR, wherein R is hydrogen or a $C_1$-$C_{12}$ hydrocarbyl, in presence of a catalyst system comprising:
   (a) a solid catalyst component obtained by reacting a titanium compound comprising at least one Ti—Cl bond with a catalyst precursor comprising formula $MgCl_n(OR^I)_{2-n}$, wherein n is from 0.5 to 1.5, the solid catalyst component comprising Ti, Mg, halogen, and $OR^I$, wherein $R^I$ is a $C_1$-$C_{12}$ hydrocarbon optionally comprising at least one heteroatom, wherein the solid catalyst component comprises a $OR^I$/Ti molar ratio of at least 0.5, and an amount of titanium higher than 4% by weight, with respect to a total weight of the solid catalyst component, the solid catalyst component comprising a SS—NMR pattern comprising at least one signal (A) comprising a maximum in region 60-75 (ppm), and at least one signal (B) comprising a maximum in region 78-108 (ppm), wherein a ratio $I^A/I^B$ is higher than 0.8, and wherein $I^A$ is an integral of the at least one signal comprising a maximum in the region between 60 and 75 ppm; and $I^B$ is an integral of the at least one signal comprising a maximum in the region between 78 and 108 ppm; and
   (b) an aluminum alkyl compound as a cocatalyst.

2. The process according to claim 1, wherein the ratio $I^A/I^B$ is higher than 1.

3. The process according to claim 1, wherein the $OR^I$/Ti molar ratio is higher than 1.

4. The process according to claim 1, wherein $R^I$ is a $C_1$-$C_8$ hydrocarbon selected from alkyl groups.

5. The process according to claim 1, wherein the amount of titanium is higher than 5%, with respect to a total weight of the solid catalyst component.

6. The process for preparing crystalline ethylene (co)polymers according to claim 1, further comprising carrying out a slurry polymerization of ethylene alone or with olefins $CH_2$=CHR, wherein R is hydrogen or a $C_1$-$C_{12}$ hydrocarbyl, in an inert medium.

7. A process for preparing crystalline ethylene (co)polymers comprising polymerizing ethylene alone or with olefins $CH_2$=CHR, wherein R is hydrogen or a $C_1$-$C_{12}$ hydrocarbyl, in presence of a catalyst system comprising:
   (a) a solid catalyst component comprising Ti, Mg, halogen, and $OR^I$, wherein $R^I$, wherein the solid catalyst component comprises a $OR^I$/Ti molar ratio of at least 0.5, an amount of titanium higher than 4% by weight, with respect to a total weight of the solid catalyst component, and wherein the catalyst system is obtained by reacting a titanium compound comprising at least one Ti—Cl bond with at least one catalyst precursor of formula $MgCl_n(OR^I)_{2-n}$, wherein n is from 0.5 to 1.5; and $R^I$ is a $C_1$-$C_{12}$ hydrocarbon optionally comprising at least one heteroatom; and
   (b) an aluminum alkyl compound as a cocatalyst.

8. The process according to claim 7, wherein the titanium compound comprise formula $Ti(OR^I)_{p-y}Cl_y$, wherein $R^I$ is a $C_1$-$C_{12}$ hydrocarbon optionally comprising at least one heteroatom; p is a titanium valence; and y is a number between 1 and p.

9. The process according to claim 7, wherein the catalyst system is obtained by reacting the catalyst precursor with the titanium compound in an amount such that a molar ratio between the titanium compound and the $OR^I$ of the catalyst precursor is 4 or less.

10. The process according to claim 7, wherein the catalyst system is obtained by reacting the catalyst precursor with the titanium compound in an amount such that a molar ratio between the titanium compound and the $OR^I$ of the catalyst precursor is higher than 4, at a reaction temperature lower than 100° C.

11. The process for preparing crystalline ethylene (co) polymers according to claim 7, further comprising carrying out a slurry polymerization of ethylene alone or with olefins $CH_2$=CHR, wherein R is hydrogen or a $C_1$-$C_{12}$ hydrocarbyl, in an inert medium.

* * * * *